No. 848,348. PATENTED MAR. 26, 1907.
E. B. CHURCH.
POTATO DIGGER.
APPLICATION FILED DEC. 11, 1906.
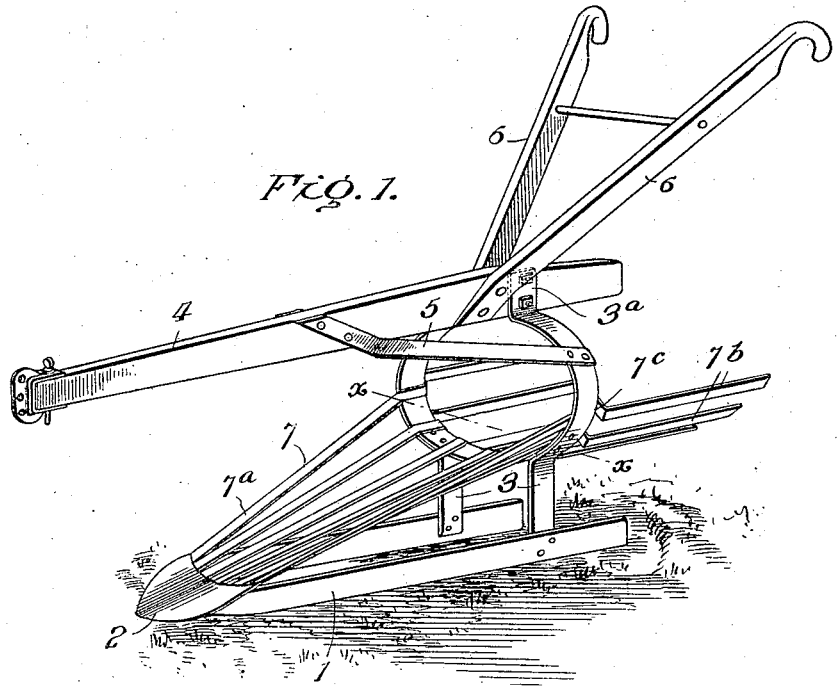
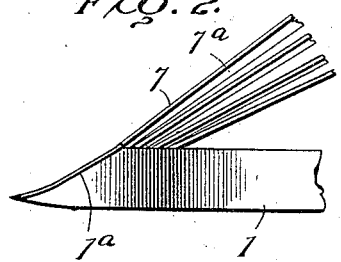
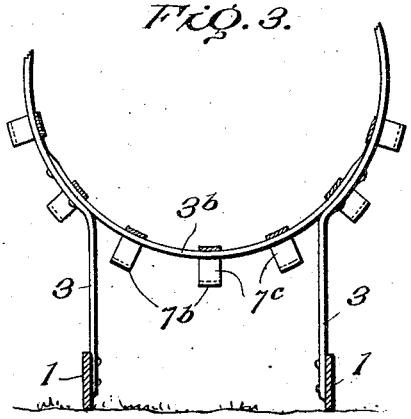
Witnesses
Inventor
E. B. Church,
Attorneys

UNITED STATES PATENT OFFICE.

EDWIN B. CHURCH, OF SATTLEY, CALIFORNIA.

POTATO-DIGGER.

No. 848,348. Specification of Letters Patent. Patented March 26, 1907.

Application filed December 11, 1906. Serial No. 347,347.

*To all whom it may concern:*

Be it known that I, EDWIN B. CHURCH, a citizen of the United States, residing at Sattley, in the county of Sierra and State of California, have invented certain new and useful Improvements in Potato-Diggers, of which the following is a specification.

The object of my invention is to provide an improved potato-digging plow that will operate efficiently to dig out the potatoes and separate them from the roots and dirt.

For a full understanding of the invention and the merits thereof and also to acquire a knowledge of the details of construction and the means for effecting the result reference is to be had to the following description and accompanying drawings, in which—

Figure 1 is a perspective view of my improved potato-digging plow. Fig. 2 is a detail side elevation of the front end of the plow. Fig. 3 is a transverse sectional view on the line $x\ x$ of Fig. 1.

Corresponding and like parts are referred to in the following description and indicated in all the views of the drawings by the same reference characters.

Referring to the drawings, the numeral 1 designates a pair of runners, which are arranged parallel, as shown, and are provided with beveled front ends $1^a$, that are bowed or converged, as shown, and support the shovel 2 in inclined position.

3 designates two arched bars, that are secured at their lower ends to the runners 1 near the rear ends of the latter and that extend straight up from said runners for a portion of their length and are then bowed outwardly and thence inwardly with their meeting ends provided with upwardly-extending offset extremities $3^a$. A curved brace $3^b$ extends across from one arched bar 3 to the other and practically completes the circle of the curved portions of said bars.

A plow-beam 4 is secured at its rear end between the lateral or offset extremities $3^a$ of the arched bars 3 and extends forwardly from said arched bars preferably to a point in advance of the shovel 2, the said beam being braced by oblique braces 5, that are secured at their rear ends to the arched bars 3. Handles 6, of any desired construction or design, are secured to said plow-beam, as illustrated.

Extending rearwardly from the shovel 2 are a series of spaced-apart separating-bars 7. These bars embody front inclined portions $7^a$, that are secured at their forward ends to the shovel at the rear edge of the latter, and which extend rearwardly and upwardly from said ends in a slightly-diverging manner and are secured at the opposite ends (of these sections) to the curved cross-brace $3^b$. Some of them are also secured to the other portion of the ring which is constituted by the said cross-brace $3^b$ and the other curved portions of the arched bars 3. In addition to the sections of portions $7^a$ these separating-bars 7 embody rear portions $7^b$, that extend parallel to each other and are curved transversely, as a series, in the rear of the said ring just mentioned, and each of the said bars 7 at this point is offset outwardly from the said ring, as indicated at $7^c$.

From the foregoing description, in connection with the accompanying drawings, it is obvious that as the plow is drawn along the ground the shovel will dig up the potatoes, which will be caused to move rearwardly and upwardly over the separating-bars 7, which will cause most of the dirt and roots to be separated from the potatoes. As the potatoes pass upwardly and rearwardly they will be crowded backwardly through the ring of the arched bars 3 and thence drop upon the parallel offset portions $7^b$ of the said separating-bars. This dropping action will jar the potatoes and insure that all the dirt and roots will be separated therefrom.

It will be seen that I have provided a very durable and strong construction of potato-digger of this type, which will be efficient in operation to separate the potatoes from the dirt and roots that might otherwise adhere to them and which in the operation will leave the potatoes as free as possible from the roots and dirt when they fall through the rear portions of the separating-bars 7 or out over the rear extremities thereof.

Having thus described the invention, what is claimed as new is—

1. A potato-digger, comprising a pair of runners provided with converging beveled front ends, a shovel supported on and secured to said beveled front ends, upwardly-extending bars connecting said runners together near their rear ends, a plow-beam supported by said bars and extending over the shovel, handles secured to said beam, and separating-bars extending upwardly and rearwardly from said shovel and through and in rear of the said bars.

2. A potato-digger, comprising a pair of runners, a shovel supported on the front end of said runners, arched bars secured to the respective runners near their rear ends and the same projecting upwardly therefrom, said bars being curved outwardly and thence inwardly, a curved cross-brace 3$^b$ connecting said arched bars together and forming a ring in said bars, a plow-beam secured near the upper ends of said bars, handles for the said beam, and separating-bars extending from said shovel to the said ring and secured at their ends to the shovel and ring respectively, as and for the purpose set forth.

3. A potato-digger, comprising a pair of runners, a shovel supported on the front end of said runners, arched bars secured to said runners near their rear ends and projecting upwardly therefrom, said bars being curved outwardly and thence inwardly, a curved brace connecting the curved portions of said arched bars together, thereby to produce a ring, a plow-beam supported by said bars, handles for said beam, and separating-bars extending upwardly and rearwardly from said shovel and through the said ring and provided with outwardly offset rear ends in the rear of said ring.

In testimony whereof I affix my signature in presence of two witnesses.

EDWIN B. CHURCH. [L. S.]

Witnesses:
J. J. BERRY,
H. E. CUNNINGHAM.